United States Patent
Matsugi et al.

(10) Patent No.: US 11,495,128 B2
(45) Date of Patent: Nov. 8, 2022

(54) IN-VEHICLE INFORMATION SYSTEM

(71) Applicant: HONDA MOTOR CO., LTD., Tokyo (JP)

(72) Inventors: Yoshihiro Matsugi, Wako (JP); Kenji Okuma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/151,803

(22) Filed: Jan. 19, 2021

(65) Prior Publication Data

US 2021/0241617 A1 Aug. 5, 2021

(30) Foreign Application Priority Data

Jan. 31, 2020 (JP) .............................. JP2020-015480

(51) Int. Cl.
*G06K 9/62* (2022.01)
*G08G 1/0962* (2006.01)
*G06V 40/50* (2022.01)
*G06V 40/16* (2022.01)

(52) U.S. Cl.
CPC .......... *G08G 1/0962* (2013.01); *G06V 40/168* (2022.01); *G06V 40/172* (2022.01); *G06V 40/50* (2022.01)

(58) Field of Classification Search
CPC ...... G06V 40/16–40/179; G06V 40/50–40/58; G06V 20/59–20/597; G06T 2207/30268; G08G 1/0968–1/0969
See application file for complete search history.

(56) References Cited

U.S. PATENT DOCUMENTS

| 2017/0124987 | A1* | 5/2017 | Kim ................. G06V 20/593 |
| 2019/0276047 | A1 | 9/2019 | Suzuki et al. |
| 2019/0289435 | A1 | 9/2019 | Tada et al. |

FOREIGN PATENT DOCUMENTS

| JP | 2010-160066 A | | 7/2010 |
| JP | 2018-045334 A | | 3/2018 |
| JP | 2019-132811 A | | 8/2019 |
| JP | 2019132928 A | * | 8/2019 |
| JP | 2019-159711 A | | 9/2019 |
| JP | 2019-164475 A | | 9/2019 |

OTHER PUBLICATIONS

Japanese Office Action for Japanese Patent Application No. 2020-015480 dated Aug. 27, 2021 (partially translated).

* cited by examiner

*Primary Examiner* — Brian Werner
(74) *Attorney, Agent, or Firm* — Thomas | Horstemeyer, LLP

(57) ABSTRACT

An in-vehicle information system mounted on a vehicle is provided. The system comprises a registration unit configured to register identification information and a name of each user and a name of a group including a plurality of users; a recognition unit configured to recognize a user who is an occupant of the vehicle based on the identification information; and a control unit configured to cause an output unit to output a name corresponding to the user recognized by the recognition means.

8 Claims, 5 Drawing Sheets

IN-VEHICLE INFORMATION SYSTEM

CROSS-REFERENCE TO RELATED APPLICATION(S)

This application claims priority to and the benefit of Japanese Patent Application No. 2020-015480 filed on Jan. 31, 2020, the entire disclosure of which is incorporated herein by reference.

BACKGROUND OF THE INVENTION

Field of the Invention

The present invention relates to, for example, an in-vehicle information system that is incorporated in a vehicle and performs information processing.

Description of the Related Art

There is proposed a navigation apparatus that can perform voice guidance at a predetermined guidance timing in accordance with the presence/absence of a passenger (See Japanese Patent Laid-Open No. 2010-160066). Japanese Patent Laid-Open No. 2010-160066 discloses that the navigation apparatus stores voice guidance information used for performing guidance about intersection guidance, low fuel warning, and the like at predetermined guidance timings in correspondence with the presence/absence of a passenger and the relationship between the driver and the passenger. The navigation apparatus uses, for example, a seat weight sensor to determine the presence/absence of a passenger at a guidance timing, and determines whether the passenger is a specific passenger such as a family member or the like if it is determined that a passenger is present. Voice guidance is output, with respect to a single guidance timing, in correspondence with each of a case in which a passenger is not present, a case in which a passenger is a specific passenger, and a case in which a passenger is not a specific passenger.

Also, Japanese Patent Laid-Open No. 2010-160066 discloses that, as a method of determining a specific passenger, a camera ECU will be used to determine whether the face of the passenger is similar to the face of a family member who is closely related to the driver.

In this manner, Japanese Patent Laid-Open No. 2010-160066 discloses that the navigation apparatus will output guidance information which has been prepared in accordance with the presence/absence of a passenger and the classification of the passenger. However, since the guidance information to be output is not information corresponding to a driver and a passenger who have been recognized individually, the provision of appropriate guidance information is difficult.

SUMMARY OF THE INVENTION

The present invention provides an in-vehicle information system that can output precise and concise information corresponding to a user.

The present invention includes the following arrangement. According to an aspect of the present invention, there is provided an in-vehicle information system mounted on a vehicle, comprising: a registration unit configured to register identification information and a name of each user and a name of a group including a plurality of users; a recognition unit configured to recognize a user who is an occupant of the vehicle based on the identification information; and a control unit configured to cause an output unit to output a name corresponding to the user recognized by the recognition means.

According to the present invention, an in-vehicle information system that can output precise and concise information corresponding to a user is provided.

DESCRIPTION OF THE EMBODIMENTS

Figure 1:
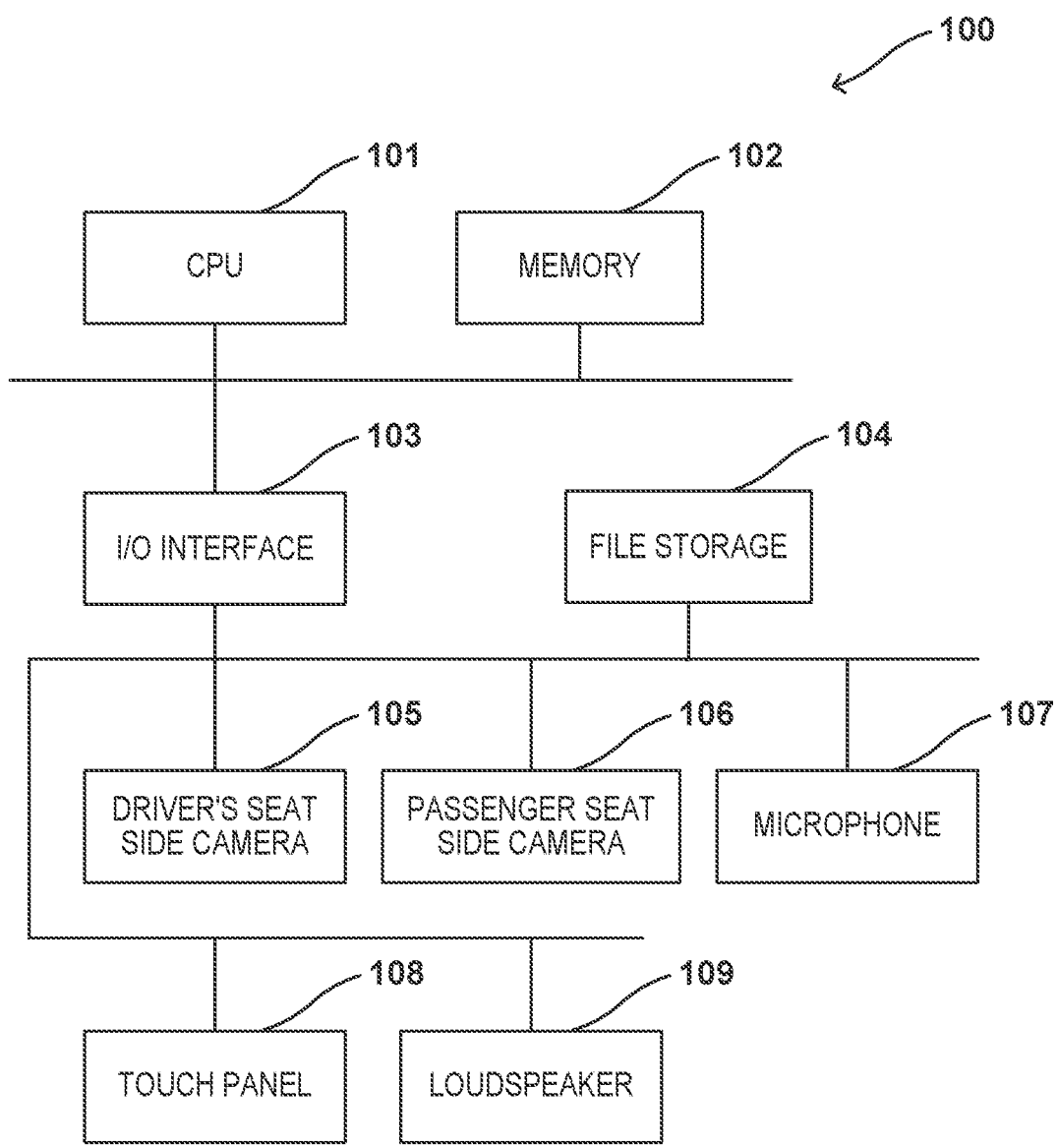
FIG. 1 is a block diagram showing an example of the arrangement of an in-vehicle information system.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

● System Arrangement

FIG. 1 shows an example of the arrangement of an information system, that is, an in-vehicle information system which is incorporated in a vehicle, for example, a four-wheeled vehicle or the like. The in-vehicle information system may be, for example, a navigation system that guides a travel path to a destination, a dashboard camera that records images inside and outside the vehicle, or the like. In this case, for example, a GPS antenna, a map information database, and the like will be included in the in-vehicle information system if the in-vehicle information system is a navigation system, and an external imaging camera and the like will be included if the in-vehicle information system is a dashboard camera. However, FIG. 1 shows only an arrangement for implementing a message outputting operation according to this embodiment, and omits illustration of an apparatus-specific device such as the navigation system or the like. Note that an in-vehicle information system may also be referred to as an information processing apparatus such as a computer or the like which includes the aforementioned device.

In FIG. 1, an in-vehicle information system 100 includes a processor (or a CPU) 101, a memory 102 such as a RAM or the like, and an input/output (I/O) interface 103 which are connected to each other by a bus. The memory 102 stores an executable program, data, and the like. The CPU 101 executes the program to control processing and input/output of data. The I/O interface 103 is an interface to the various kinds of input/output devices. A file storage 104, a driver's seat side camera 105, a passenger seat side camera 106, a microphone 107, a touch panel 108, and a loudspeaker 109 are included as various kinds of input/output devices.

The file storage 104 stores program files and data files and can be, for example, a hard disk, a nonvolatile semiconductor memory which has an interface compatible with the hard disk, or the like. A program file includes a program for implementing the procedures of flowcharts to be described later with reference to FIGS. 2 and 4. Also, a data file includes, for example, a group list, a user file which has the arrangement of a record for storing user information for identifying a user shown in FIG. 3, and the like. These files can be loaded into the memory 102 and be executed or processed.

The driver's seat side camera 105 and the passenger seat side camera 106 are input devices, and either of the cameras is a digital camera that optically captures an object to generate digital image data or to further store the digital image data. The difference between the driver's seat side camera 105 and the passenger seat side camera 106 is the target object; the driver's seat side camera 105 captures the face of a user who is sitting in the driver's seat, and the passenger seat side camera 106 captures the face of a user who is sitting in the passenger seat. In addition, the cameras are not limited to those arranged with respect to the driver's seat and the passenger seat, and a camera for capturing a user sitting in another seat such as a rear passenger seat may be included. Note that if the faces of a plurality of users can be captured by using a single camera, only a single camera may be arranged. A captured facial image can be used for facial recognition for specifying a user based on facial features.

The microphone 107 is an input device, and it converts a voice input into a digital signal and converts the digital signal into digital voice data. The microphone may also be able to store the digital voice data. This digital voice data can be used as a target of voice recognition by the CPU 101, and can be converted into text data by voice recognition processing. As a result, the user can input a text by voice.

The touch panel 108 is an input/output device, and an input can be performed on the touch panel % ben a user performs a predetermined gesture such as touching an operation screen or the like. The operation screen is also a display screen and can display an image, a text, and the like. For example, in a case in which the in-vehicle information system is a navigation system, the user can make a desired input or display a guidance screen such as a map on the touch panel 108. In addition, a virtual keyboard for inputting a text can be implemented by displaying buttons and a keyboard on the touch panel 108 and allowing the user to touch the positions corresponding to the respective keys. Furthermore, when a user has been recognized upon entering the vehicle, the touch panel 108 can be used to display a message corresponding to the recognized user.

The loudspeaker 109 is an output device and outputs voice. The voice can be output when, for example, the CPU 101 generates voice data based on text data and outputs the voice data as voice through the loudspeaker 109. The loudspeaker 109 is used for, for example, outputting various kinds of voice messages output by a navigation system. Furthermore, for example, when a user who has entered the vehicle has been recognized, the loudspeaker can be used to output a message corresponding to the recognized user by voice.

● User Registration Processing

The in-vehicle information system 100 can recognize each user who has entered the vehicle at the timing at which the user has entered the vehicle, and cause the vehicle to reflect the settings stored with respect to the user. The reflection of the settings by the vehicle can be performed in cooperation with a vehicle control system. For example, if the user has registered the position of a power seat, the seat can be moved to the registered position corresponding to the recognized user. Various kinds of settings of the vehicle and the in-vehicle information system which can be customized by the user can be changed based on the stored settings associated with the recognized user. The recognition of the user by the in-vehicle information system 100 may be referred to as a "login", and the user may be referred to as a "login user". Note that the login user may be assumed to be the driver in cases where it is simply described that a login has occurred. In addition, arranging settings for each user and the settings thereof may be referred to as a "personal profile".

Figure 3:
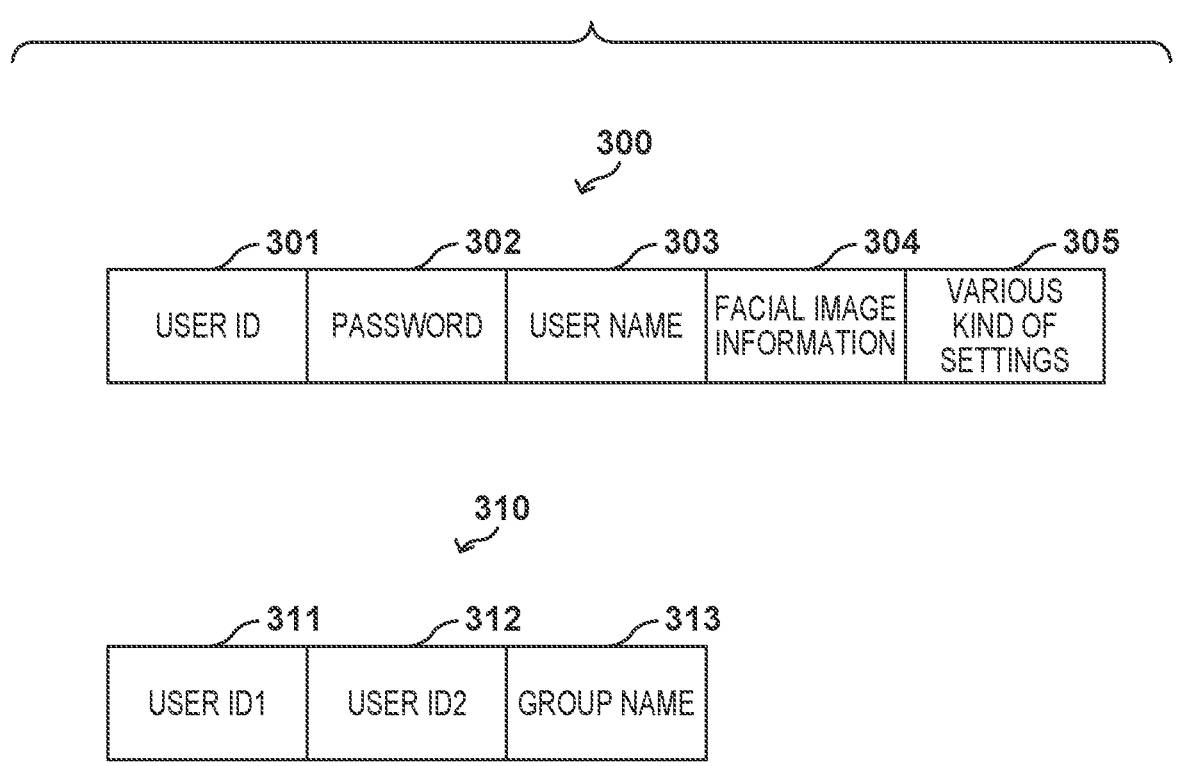
FIG. 3 is a schematic view showing an example of a user record.

FIG. 3 shows an example of user information referred for user recognition. FIG. 3 shows a user record 300 which forms a user file and a group record 310 which forms a group list included in the user information. The user record 300 is information registered for each user. The user record 300 includes a user ID 301, a password 302, a username 303, a facial image information 304, and various kinds of settings 305. The user ID 301 is identification information used for individually identifying the user, and can be appropriately assigned (by using a serial number or the like) by the in-vehicle information system 100, for example, at the registration of the user information. In a user recognition processing operation performed by manual input, the user may input this user ID by voice or via the touch panel or the like. The password 302 is information registered arbitrarily by the user, and is information input to prevent identity fraud or the like when user recognition is to be performed by manual input. If a password has not been registered, password input will not be required even at the time of user recognition.

The username 303 is a text displayed or output by voice when, for example, user recognition has succeeded, that is, when login has been performed. The text to be output may not only be the username 303, but may also be a text to which a predetermined text has been added. The username 303 is designated by the user at the time of user registration. The facial image information 304 is information registered arbitrarily by the user, and is the user's facial image (or the feature information of the facial image) which is registered in advance to perform user recognition by facial recognition. During user recognition, when the face is recognized from an image captured by the driver's seat side camera 105 or the passenger seat side camera 106, the feature of this facial image is compared with the facial image information 304. If it is determined that the features match, the process will proceed by assuming that the corresponding user has entered the vehicle and has logged in. The various kinds of settings 305 include settings unique to each user, for example, the aforementioned seat position settings and the like, and can be registered when the login user stores the data indicating a desired setting state in a state in which the desired setting has been set. Note that another piece of biological information unique to the user may be used instead of the facial information.

The group record 310 includes a user ID 1311, a user ID 2 312, and a group name 313. Although the number of user IDs included in the group record may be one or three or more, two user IDs are included in this example. The user ID 1 311 and the user ID 2 312 are the user IDs of users registered in their respective user records. A single user group is formed by users, each registered in a single user record, who have been associated with each other. The group name 313 is the name of the user group including the user ID 1 311 and the user ID 2 312. When a plurality of users who have entered a vehicle have been recognized and the recognized users have been registered as a user group, the corresponding group name 313 is output as, for example, a message. Registration of a plurality of user groups which include the same users may be prohibited at the time of registration. In addition, a code indicating the relationship between the users (for example, a married couple, a parent and a child, friends, or the like) may be registered instead of the group name 313. The information to be output in this case may be a text set in correspondence with the code. Note that although the group record is illustrated in FIG. 3 as if it is a file independent of the user record, the group name and the user IDs forming the group may be included as a field of the user record.

Figure 2:
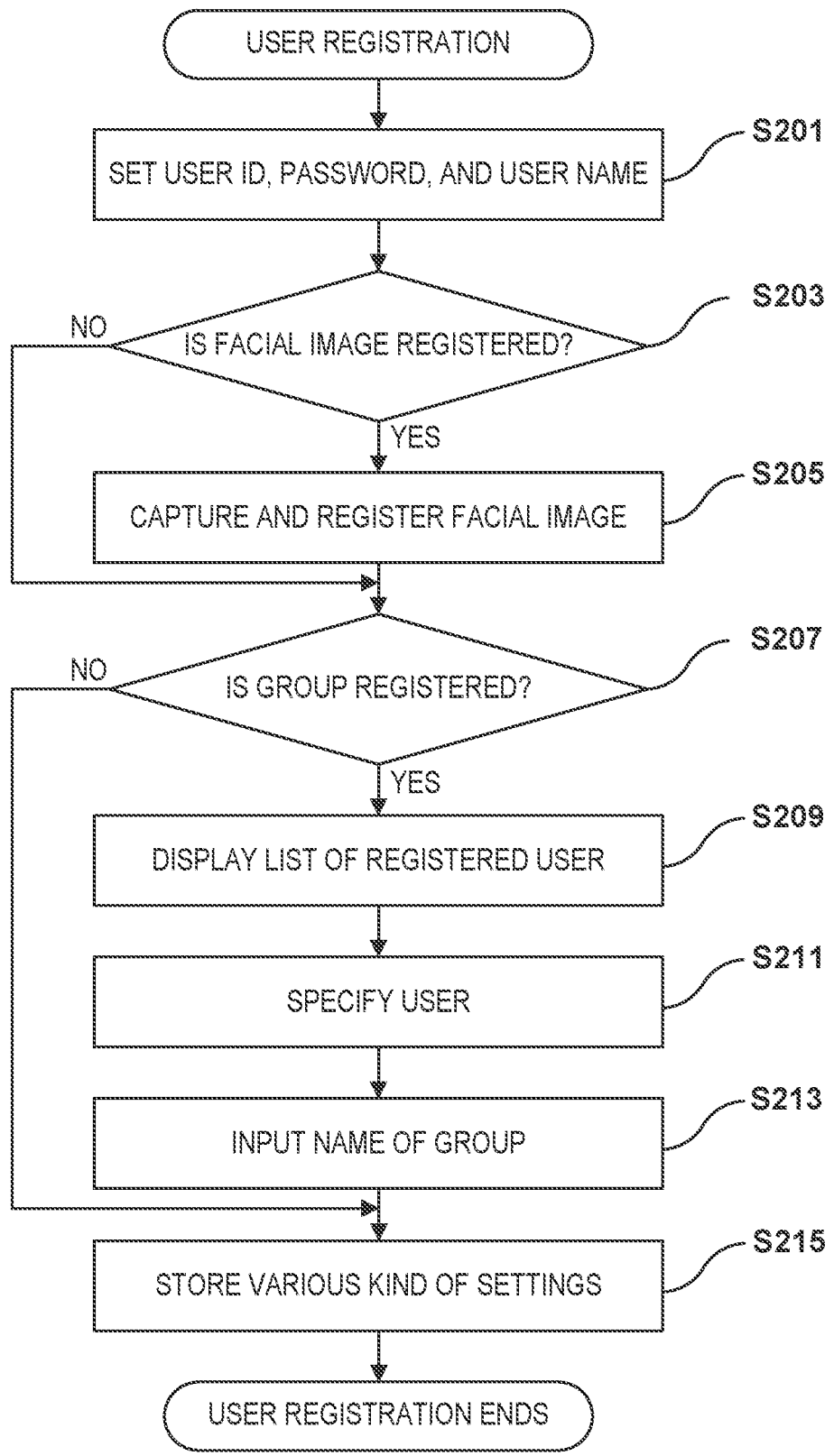
FIG. 2 is a flowchart showing an example of the procedure of user registration by the in-vehicle information system.

FIG. 2 shows a flowchart of the procedure of user registration processing by the in-vehicle information system 100. This procedure is executed by the CPU 101 and registers the user information described in FIG. 3. The procedure shown in FIG. 2 is started when, for example, the user touches a user registration button displayed on the touch panel 108. Note that at registration, the user will sit in, for example, the driver's seat or the passenger seat and operate the touch panel in this state. At this time, the in-vehicle information system 100 will attempt to recognize the user, but will fail at recognizing the user if it is before the completion of the registration. In such a case, the registration will be performed in a state without a login user or a state in which the login user is recognized as a guest.

The user will first input and set the user ID, the password, and the user ID (step S201). The user ID need not be registered in a case in which the user ID is to be assigned by the in-vehicle information system 100. Since the user ID assigned by the in-vehicle information system will be displayed after the registration in this case, the user will need to remember this user ID in preparation for the login. The user ID, the password, and the username that have been input are stored in their respective fields in the newly added user record 300.

Whether the facial image of the user is to be registered is determined next (step S203). Registration of a facial image is arbitrary. For example, after the process of step S201, a button which can be pressed by the user to indicate whether the user intends to register a facial image can be displayed on the touch panel 108, and the determination of step S203 can be performed based on the user's selection as to whether to register a facial image. If it is determined that a facial image is to be registered, the face of the user is captured by the driver's seat side camera 105 or the passenger seat side camera 106. The CPU 101 will recognize the facial region from the captured image, and the facial image or the feature information thereof will be registered as the facial image information 304 (step S205). If it is determined that the facial image is not to be registered, the process of step S205 will be skipped.

Whether a group is to be registered is determined next (step S207). Registration of a group is arbitrary. For example, after the process of step S205, a button which can be pressed by the user to indicate whether the user intends to register a group can be displayed on the touch panel 108, and the determination of step S207 can be performed based on the user's operation as to whether to register a group. If it is determined that a group is to be registered, a list of registered users will be displayed (step S209). When the operator designates each user who is to form a group with the user currently undergoing the registration from this list, the user ID of the user currently undergoing the registration and the user ID of each designated user are stored in the group record 310 (step S211). Finally, when the user inputs the name of this group, this name will be associated and stored as the group name of the set of user IDs stored in step S211 (step S213).

Lastly, the various kinds of settings that are currently set are stored as the various kinds of settings 305 (step S215). The storage of various kinds of settings may be selected arbitrarily, and for example, the user may store the settings by touching a button for designating the storage of the settings. In addition, it may be arranged so that selection of items to be stored will be accepted, and the setting of each selected item may be stored. Note that group registration may be performed independently of the user registration. In such a case, for example, the user can touch a group registration button displayed on the touch panel 108 to execute the process from step S209. In addition, in group registration, it may be arranged so that all of the users belonging to the group can be selected in the process of step S211 regardless of the current login user.

A new user record and a group list can be registered by the above-described procedure. Note that deleting and changing the contents of a registered user record and a group list can be permitted. In order to implement this, a user interface for changing the contents of the user record of the current login user may be displayed on the touch panel 108, and the user can make an operation to change or to delete the contents via this user interface.

❖ Procedure of User Recognition (Login) Processing

Figure 4:
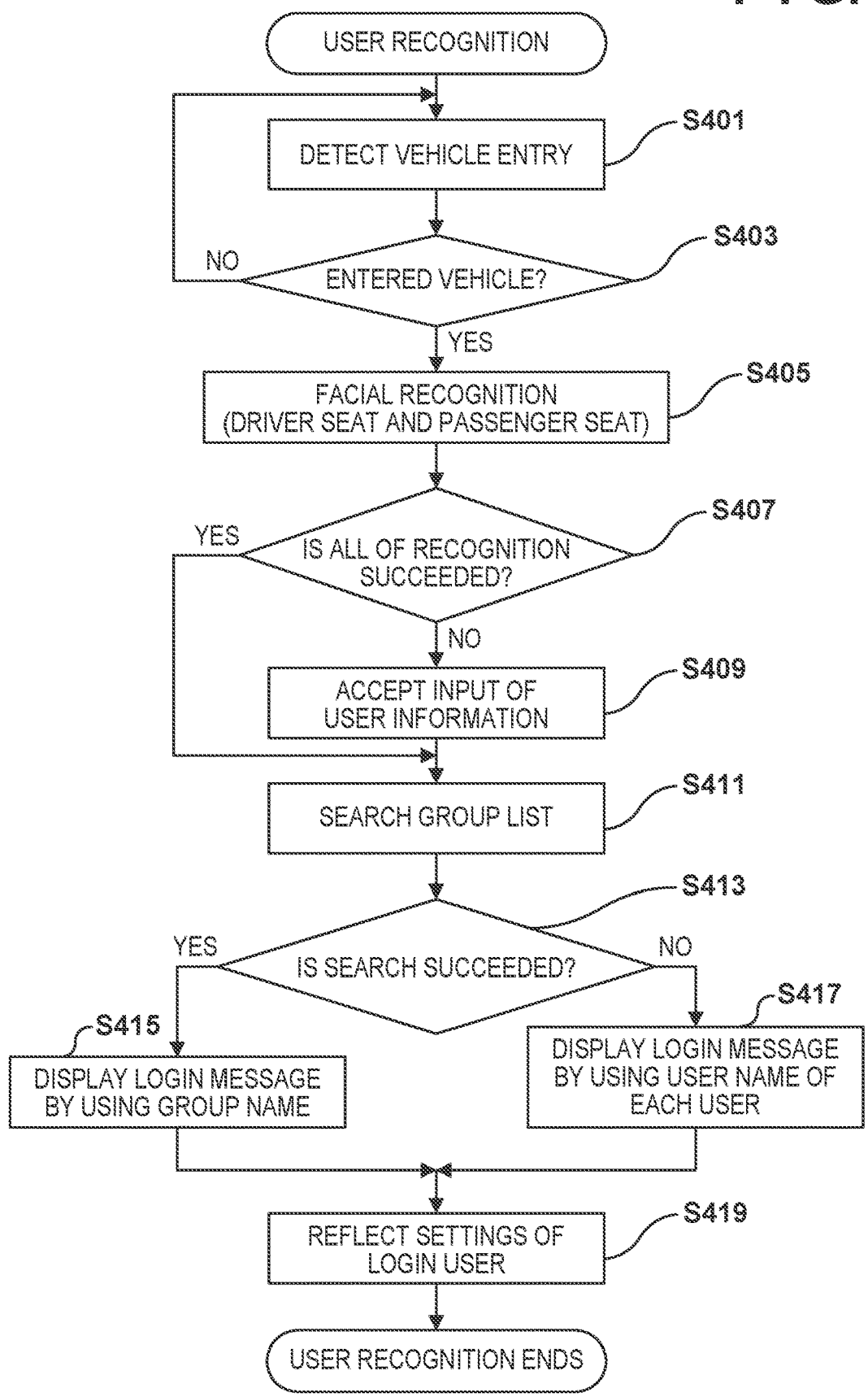
FIG. 4 is a flowchart showing an example of the procedure of user recognition by the in-vehicle information system.

FIG. 4 shows an example of the procedure of user recognition processing to be executed by the CPU 101 at a user's entry into the vehicle. In FIG. 4, the processes of step S401 and step S403 may be repeatedly executed periodically (for example, at an interval of 0.1 sec to 0.5 sec), for example, in a state in which the door lock is unlocked. First, the entry of the user into the vehicle is detected (step S401), and whether the user has entered the vehicle is determined (step S403). The vehicle entry detection can be executed by, for example, periodically executing facial region recognition on an image captured by the driver's seat side camera 105 or the passenger seat side camera 106. Vehicle entry by the user can be determined if a facial region has been recognized. Alternatively, a user's entry into the vehicle may be detected by a sensor (not shown) provided in the vehicle. For example, a user's entry into the vehicle may be determined in a case in which a sensor arranged on a door has detected the opening/closing of the door, a case in which a weight sensor arranged in the seat has detected a load of a predetermined value (for example, about 30 kg) or more, or a case in which a sensor arranged on the seat belt has detected the attachment of the seat belt. Alternatively, instead of the determination on one of these aforementioned cases, the determination may be made based on a combination of two or more of these cases. Furthermore, it may be also combined with the detection result obtained by the camera described above. The combination method may be the logical conjunction or the logical sum of the results by the respective sensors.

Note that since the vehicle entry detection is performed independently for the driver's seat and the passenger seat, the vehicle entry determination of step S403 may be performed at a timing as follows. That is, for example, in a case in which vehicle entry is detected first on the side of the passenger seat, the CPU will wait for vehicle entry to occur on the side of the driver's seat and determine in step S403 that vehicle entry has occurred if vehicle entry is detected on the side of the driver's seat. Although a limit may be set to the wait time in this case, the time limit may not be set either since it can be always expected that the driver will enter the vehicle. Also, for example, in a case in which vehicle entry is detected first on the side of the driver's seat, the CPU will wait for a predetermined time for vehicle entry to occur on the side of the passenger seat, and determine in step S403 that vehicle entry has occurred if a predetermined time has elapsed since the detection of vehicle entry on the side of the driver's seat or vehicle entry on the side of the passenger seat is detected. This predetermined time may be, for example, a fixed time of about a few sec to 10 sec or may be a time until a predetermined event such as the releasing of a parking brake. In this case, an event such as the releasing of the parking brake will be detected by a dedicated sensor for this event. Note that instead of setting the wait to be a wait for a predetermined time until the occurrence of vehicle entry on the side of the passenger seat, the wait may be set to a wait until the start of travel of the vehicle. Alternatively, it may be a wait until whichever state occurs earlier.

When vehicle entry has been detected, facial recognition of the user will be executed (step S405). That is, in this example, the facial region is specified from each of the images captured by the driver's seat side camera 105 and the passenger seat side camera 106. If the facial region is specified, user recognition based on the image of the facial region, that is, the facial image will be attempted. That is, a user record that includes the facial image which matches the captured facial image will be searched. If a user record which includes the matching facial image is not found, it will be determined that the facial recognition has failed. If a user record which includes the matching image is found, it will be determined that the facial recognition has succeeded. Subsequently, determination as to whether all of the facial recognition processing operations have succeeded, that is, whether facial recognition has succeeded in both on the side of the driver's seat and the on the side of the passenger seat will be performed (step S407). For example, if only the driver is in the vehicle, the facial region will not be detected from an image obtained from the side of the passenger seat and facial recognition will not be performed on the side of the passenger seat. Hence, in such a case, it will be determined that all of the facial recognition processing operations have succeeded when the facial recognition of the driver has succeeded. Each user whose facial recognition has succeeded will be stored as an occupant associated with this seating position. Also, in particular, a user who is the driver will be the login user. It can be assumed that facial recognition of a user whose facial image has not been registered will fail. If all of the facial recognition processing operations have succeeded, the process will branch to step S411.

If all of the facial recognition processing operations have not succeeded, the input of the user information (for example, the user ID and the password) of the user whose recognition has failed will be accepted (step S409). At this time, the user will also input the seating position together with the user information. The input may be performed by voice or via the touch panel 108. The user record will be collated based on the input user ID and the password, and the recognition will succeed if there is a corresponding record. A user whose recognition has succeeded will be stored as an occupant corresponding to the seating position. Also, in particular, a user who is the driver will be set as the login user.

The group record 310 will be searched next based on the user ID of the recognized user (step S411). That is, a group including the user ID of the user seated in the driver's seat and the user ID of the user seated in the passenger seat will be searched. Subsequently, whether the search has succeeded will be determined (step S413). The search is determined to be a success if the corresponding group is discovered. Note that if there is only one recognized user, the process can be skipped until the process of step S419.

Figure 5A:
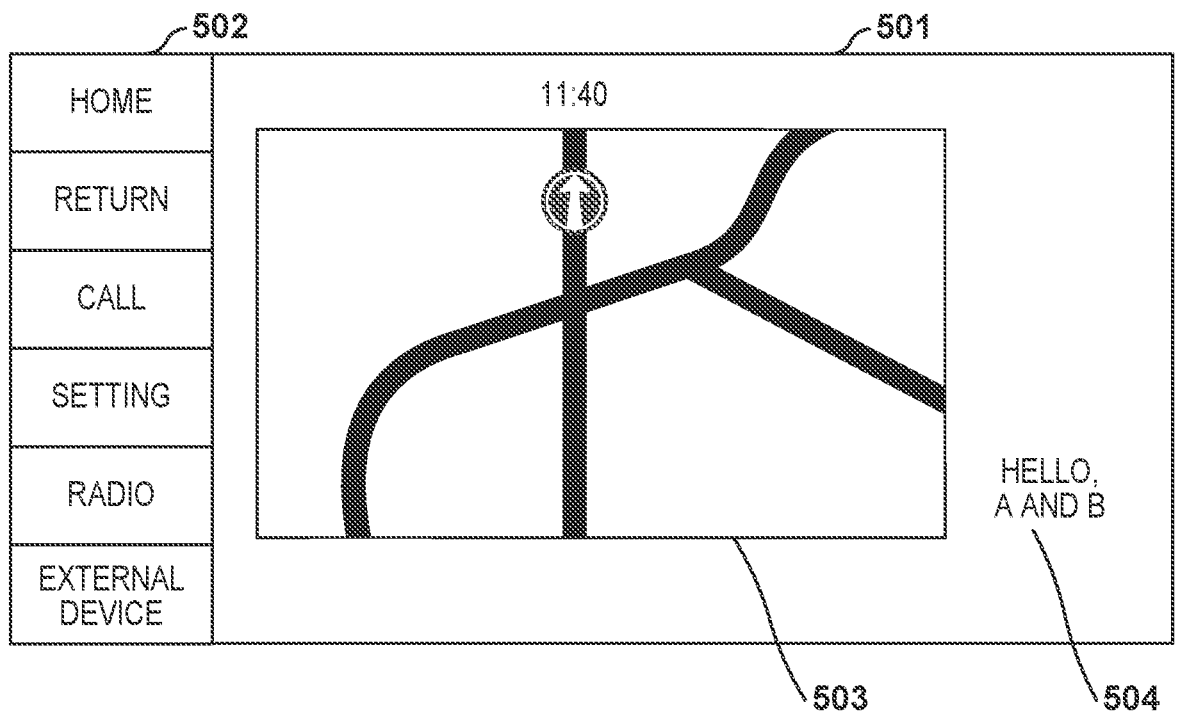
FIGS. 5A and 5B are views each showing an example of display by the in-vehicle information system.
Figure 5B:
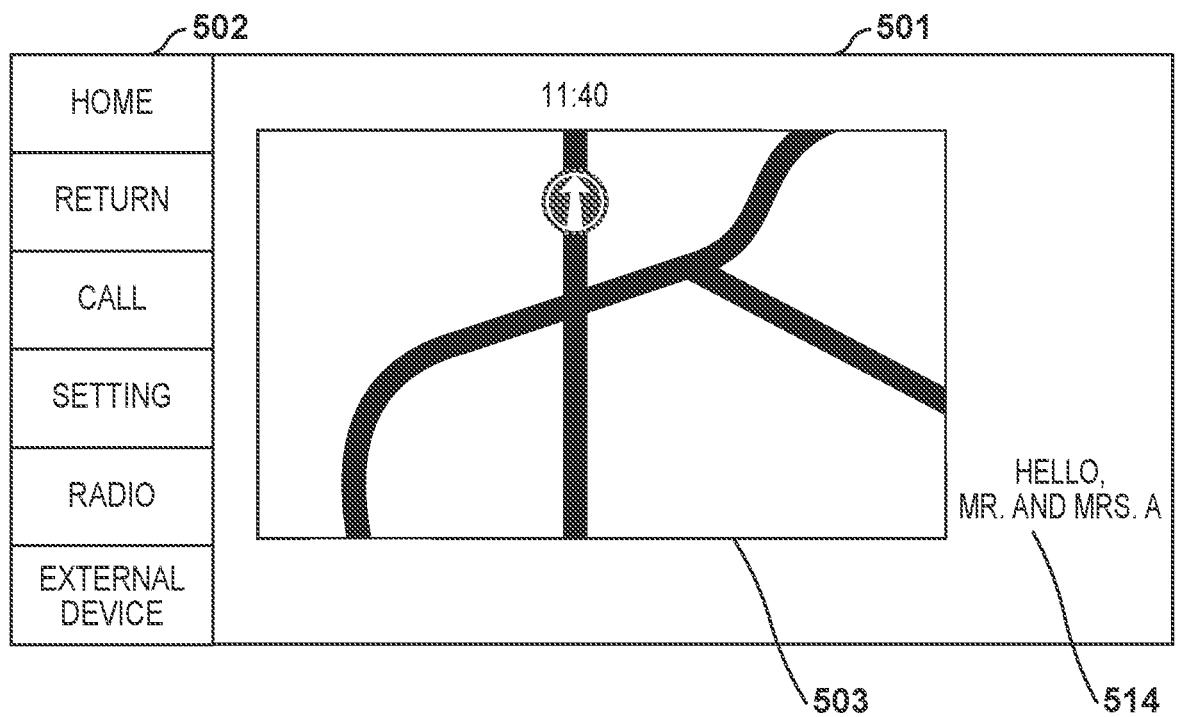

If the search is determined to be a success, a login message will be output by using the group name 313 of the corresponding group (step S415). Although it has been assumed that the output will be performed by display, it may be performed by voice or may be performed by both display and voice. FIG. 5B shows an example of the display of the login message. The login message is displayed on the touch panel 108. In FIG. 5B, various kinds of operation buttons 502 and a guidance image 503 are displayed within a display frame 501. At the time of the login, a login message 514 is further displayed. In this example, the user on the side of the driver's seat and the user on the side of the passenger seat have been registered as a group, and the group name of this group is "Mr. and Mrs. A". Hence, the login message 514 "Hello Mr. and Mrs. A", which is formed by adding a template text "Hello" before the group name, will be displayed at the time of vehicle entry.

On the other hand, if the search for a group has failed, a login message will be displayed by using the username of each user (step S417). FIG. 5A shows another example of this login message. At the time of the login, a login message 504 will be displayed. In this example, a group that includes a user A on the side of the driver's seat and a user B on the side of the passenger seat has not been registered. Hence, the login message 504 "Hello A and B", which is formed by adding a template text "Hello" before a text arranging the usernames "A and B" of the respective users, will be displayed at the time of vehicle entry. The order of the username, for example, displaying the username of the user on the side of the driver's seat first, may be determined appropriately.

Finally, the various kinds of settings 305 of the login user, that is, the user on the side of the driver's seat who has been successfully recognized will be reflected onto the various kinds of settings of the vehicle (step S419). If the user on the side of the passenger seat has been recognized, the settings, such as the temperature of the AC, the seat position, and the like, for the passenger seat of this user may be reflected as a matter of course. As a result, the settings of each individual user can be set easily without having to set the settings each time. Note that in this embodiment, a user whose login has failed can be permitted to drive the vehicle by handling the user as a guest user. However, it may be arranged so a user whose login has failed will not be permitted to drive the vehicle by not permitting the motor to be driven.

● Effects of Embodiment

As described above, according to this embodiment, in a case in which a plurality of users who can be recognized have been formed into a group, the name of the group will be used for the users in the vehicle. As a result, a precise and concise login message that corresponds to the users can be output by using, in particular, the group name in the login message for the plurality of users. In particular, since information corresponding to each user such as the driver, an occupant, or the like who has been individually recognized, will be output, it will allow the user to confirm the correctness of the recognition based on this information and can resolve the burdensomeness of outputs made for each of the plurality of occupants.

Furthermore, settings corresponding to each user can be reflected on the vehicle settings in accordance with the seat of the user.

⁕ Summary of Embodiment

The summary of the above-described embodiment is as follows.

(1) According to the first mode of the present invention, there is provided an in-vehicle information system mounted on a vehicle, comprising:

a registration unit configured to register identification information and a name of each user and a name of a group including a plurality of users;

a recognition unit configured to recognize a user who is an occupant of the vehicle based on the identification information; and a control unit configured to cause an output unit to output a name corresponding to the user recognized by the recognition unit.

According to this arrangement, a precise and concise message corresponding to the user can be output.

(2) According to the second mode of the present invention, there is provided an in-vehicle information system which is the in-vehicle information system according to (1), wherein in a case in which the name of the group including the plurality of users recognized by the recognition unit has been registered by the registration unit, the control unit outputs the name of the group by the output unit.

According to this arrangement, a precise and concise message corresponding to the users can be output by using the group name in the login message for a plurality of users.

(3) According to the third mode of the present invention, there is provided an in-vehicle information system which is the in-vehicle information system according to (1) or (2), wherein in one of a case in which the user recognized by the recognition unit is not a plurality of users and a case in which the name of a group including the user recognized by the recognition unit has not been registered by the registration unit, the control unit causes the output unit to output the name of the recognized user.

According to this arrangement, a precise and concise message corresponding to the user can be output by using the name of the user in the login message for an individual user.

(4) According to the fourth mode of the present invention, there is provided an in-vehicle information system which is the in-vehicle information system according to (1) to (3), wherein the recognition unit recognizes the user when the user has entered the vehicle.

According to this arrangement, a precise and concise message corresponding to the user can be output at the timing at which the user has entered the vehicle.

(5) According to the fifth mode of the present invention, there is provided an in-vehicle information system which is the in-vehicle information system according to (4), wherein the entry of the user into the vehicle is determined based on at least one of closing of a door of the vehicle, placing of a load on a seat of the vehicle, and attachment of a seat belt of a vehicle.

According to this arrangement, the user's entry into the vehicle can be precisely detected, and a precise and concise message corresponding to the user can be output at the timing at which the user has entered the vehicle.

(6) According to the sixth mode of the present invention, there is provided an in-vehicle information system which is the in-vehicle information system according to (1) to (5), further comprising:

an input unit configured to input the identification information of the user, wherein the recognition unit recognizes the user based on the identification information input by the input unit and the identification information registered by the registration unit.

According to this embodiment, the user can be recognized also by manual input by the user, and a precise and concise message corresponding to the user can be output.

(7) According to the seventh mode of the present invention, there is provided an in-vehicle information system which is the in-vehicle information system according to (6), wherein the input unit includes an image capturing unit for capturing a face of the occupant of the vehicle, the registration unit can register a facial image of the user as the identification information, and the recognition unit recognizes the user based on the facial image of the user captured by the image capturing unit and the facial image registered by the registration unit.

According to this arrangement, the user can be recognized by facial recognition to reduce the labor of the user, and, furthermore, a precise and concise message corresponding to the user can be output.

(8) According to the eighth mode of the present invention, there is provided an in-vehicle information system which is the in-vehicle information system according to (6), wherein the input unit includes an input unit for inputting voice.

According to this arrangement, input required for user recognition can be performed by voice.

(9) According to the ninth mode of the present invention, there is provided an in-vehicle information system which is the in-vehicle information system according to (1) to (8), wherein the output unit outputs a message including the name by one of display, voice, and both display and voice.

According to this arrangement, a precise and concise message corresponding to the user can be output by display and voice.

The invention is not limited to the foregoing embodiments, and various variations/changes are possible within the spirit of the invention.

What is claimed is:

1. An in-vehicle information system mounted on a vehicle, comprising one or more processors and one or more memories comprising one or more programs, wherein the one or more programs are configured to cause the one or more processors to:

register identification information and a name of each user and a name of a group including a plurality of users;

recognize a user who is an occupant of the vehicle based on the identification information; and output a name corresponding to of a group by an output device in a case where the name of the group containing a plurality of recognized users has been registered to the user, wherein the users include passengers in a driver seat and another seat including the passenger seat of the vehicle, wherein a passenger in the other seat is awaited for a predetermined time when a passenger in the driver seat is detected before the passenger in the other seat, and a passenger in the driver seat is awaited when a passenger in the other seat is detected before the passenger in the driver seat, and the name of a user or a group of users is recognized after waiting for the passenger.

2. The system according to claim 1, wherein in one of a case in which the recognized user is not a plurality of users and a case in which the name of a group including the recognized user has not been registered, the name of the recognized user is output by the output device.

3. The system according to claim 1, wherein the user is recognized when the user has entered the vehicle.

4. The system according to claim 3, wherein the entry of the user into the vehicle is determined based on at least one of closing of a door of the vehicle, placing of a load on a seat of the vehicle, and attachment of a seat belt of a vehicle.

5. The system according to claim 1, further comprising:
   an input device configured to input the identification information of the user,
   wherein the user is recognized based on the identification information input by the input device and the identification information registered.

6. The system according to claim 5, wherein the input device includes an image capturing unit for capturing a face of the occupant of the vehicle,
   a facial image of the user can be registered as the identification information, and
   the user is registered based on the facial image of the user captured by the image capturing unit and the registered facial image.

7. The system according to claim 5, wherein the input unit includes an input device for inputting voice.

8. The system according to claim 1, wherein the output device outputs a message including the name by one of display, voice, and both display and voice.

* * * * *